United States Patent [19]

Dorner et al.

[11] Patent Number: 5,002,457
[45] Date of Patent: Mar. 26, 1991

[54] APPARATUS FOR STORING STACKS OF ARTICLES AND SUBSEQUENTLY UNSTACKING THE ARTICLES AND FEEDING THE ARTICLES TO WORKING EQUIPMENT

[75] Inventors: Wolfgang C. Dorner, Oconomowoc; Kenneth N. Hansen; Todd A. Eggebrecht, both of Waukesha; John C. Redding, Oostburg, all of Wis.

[73] Assignee: Dorner Mfg. Corp., Hartland, Wis.

[21] Appl. No.: 486,814

[22] Filed: Mar. 1, 1990

Related U.S. Application Data

[62] Division of Ser. No. 240,717, Sep. 6, 1988, Pat. No. 4,951,803.

[51] Int. Cl.$^5$ .............................................. B65G 57/00
[52] U.S. Cl. .............................. 414/790.3; 414/798.6; 414/798.7; 414/798.9; 74/520; 198/359; 198/370; 198/372
[58] Field of Search ............... 414/789, 790.3, 797.2, 414/798.6, 798.7, 798.9; 74/520; 198/359, 370, 372, 534

[56] References Cited

U.S. PATENT DOCUMENTS

| | | |
|---|---|---|
| 2,596,404 | 5/1952 | Holbeck . |
| 3,360,100 | 12/1967 | Seragnoli . |
| 3,450,246 | 6/1969 | Seragnoli . |
| 3,470,996 | 10/1969 | Lee et al. . |
| 3,499,555 | 3/1970 | Wahle . |
| 3,557,932 | 1/1971 | Laub, III ............................ 198/32 |
| 3,876,057 | 4/1975 | Jones ................................ 198/30 |
| 3,931,882 | 10/1976 | Ossbahr ............................ 198/165 |
| 3,954,165 | 5/1976 | Snyder .............................. 198/34 |
| 4,018,325 | 4/1977 | Rejsa ................................ 198/347 |
| 4,051,746 | 10/1977 | Liljeros ............................ 74/520 |
| 4,136,766 | 1/1979 | Pryor et al. ....................... 198/372 |
| 4,219,112 | 8/1980 | Loweenthal ....................... 198/449 |
| 4,273,234 | 6/1981 | Bourgeois ......................... 198/347 |
| 4,290,517 | 9/1981 | Hafferkamp ....................... 198/427 |
| 4,396,338 | 8/1983 | Applegate et al. ................ 414/331 |
| 4,413,941 | 11/1983 | Köllman ............................ 414/789 |
| 4,487,309 | 12/1984 | Dorner ............................. 198/491 |
| 4,502,587 | 3/1985 | Clark ............................... 198/347 |
| 4,571,931 | 2/1986 | Küpper ............................. 57/281 |
| 4,609,091 | 9/1986 | Dorner ............................. 198/347 |
| 4,732,256 | 3/1988 | Dorner ............................. 198/347 |
| 4,854,817 | 8/1989 | Dorner ............................. 414/789.9 |
| 4,861,225 | 8/1989 | Dorner et al. .................... 414/798.7 X |

FOREIGN PATENT DOCUMENTS 960177 12/1974 Canada .
61-257806 11/1986 Japan .

Primary Examiner—Robert P. Olszewski
Assistant Examiner—Boris Milef
Attorney, Agent, or Firm—Andrus, Sceales, Starke & Sawall

[57] ABSTRACT

An apparatus for stacking and storing articles and subsequently unstacking the articles. The apparatus includes a first conveyor to convey a plurality of articles, and a plurality of secondary conveyors are disposed normal to a side edge of the first conveyor. To store the articles, each article is stopped on the conveyor and is pushed laterally from the main conveyor into bearing engagement against a movable stop member on a secondary conveyor. Additional articles are pushed onto the secondary conveyor into engagement with the preceding article to form a composite stack. The composite stack can be lifted from the secondary conveyor by a lifting mechanism to a storage site, and subsequently, when it is desired to release the stack from storage, the stack is lowered back onto the secondary conveyor. As the composite stack approaches the downstream end of the secondary conveyor, the individual articles are separated from the stack and fed to a third conveyor, which conveys the articles in uniformly spaced relation to working equipment.

8 Claims, 5 Drawing Sheets

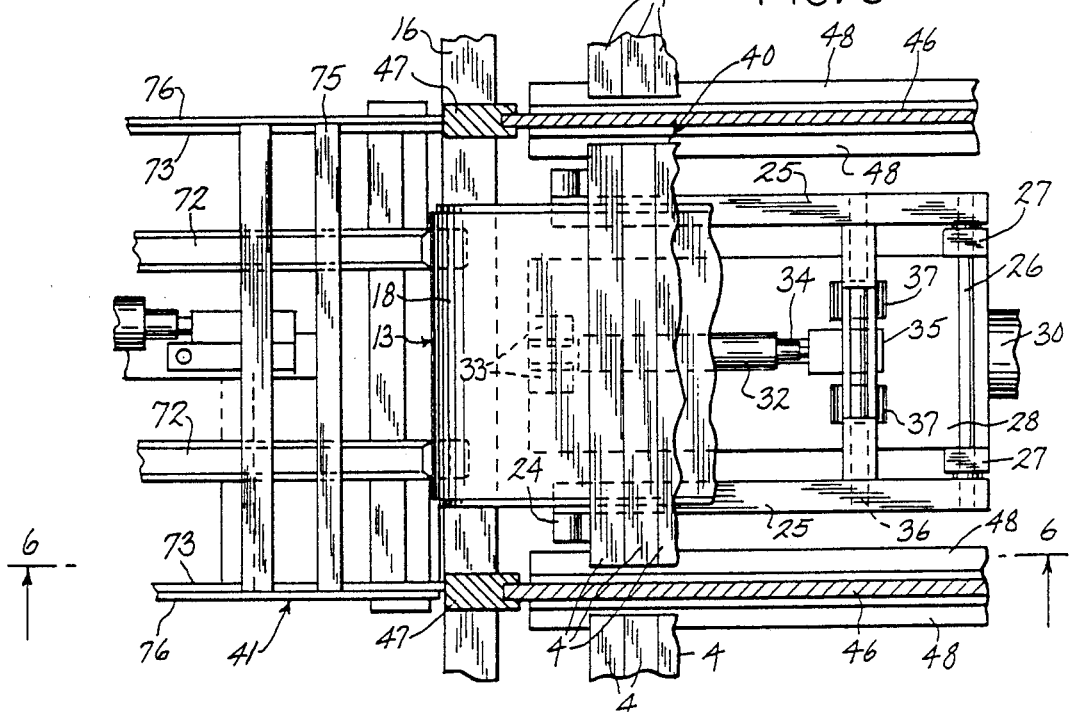
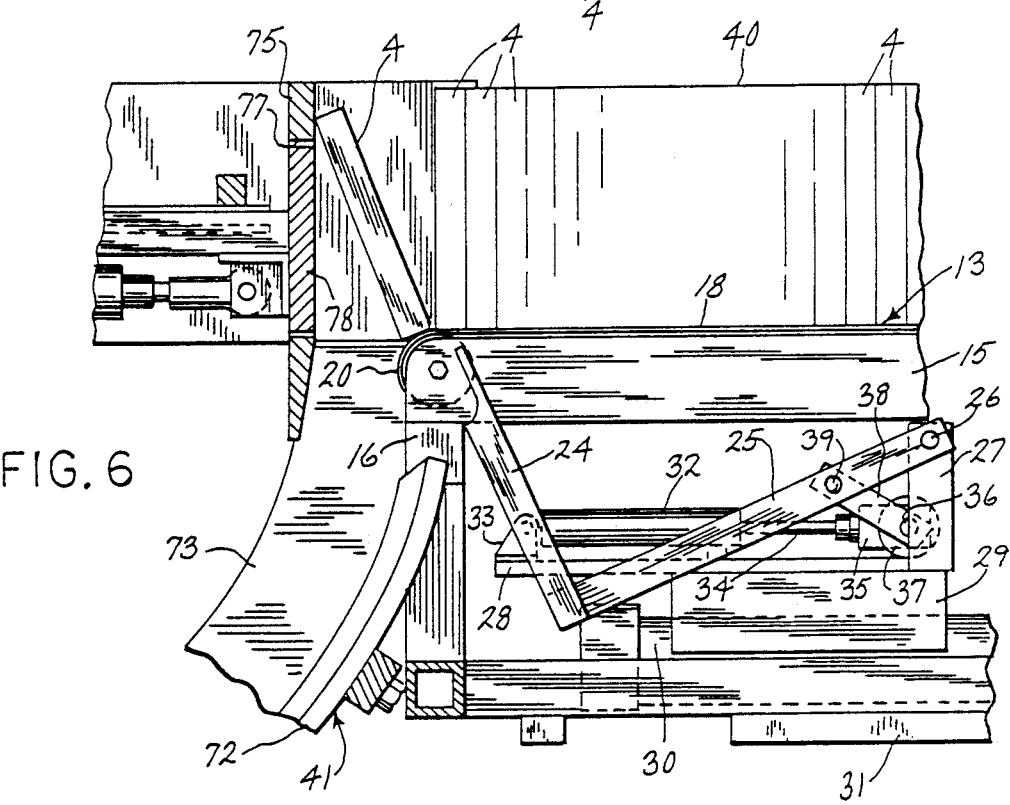

APPARATUS FOR STORING STACKS OF ARTICLES AND SUBSEQUENTLY UNSTACKING THE ARTICLES AND FEEDING THE ARTICLES TO WORKING EQUIPMENT

This is a division of application Ser. No. 07/240,717, filed Sept. 6, 1988 now U.S. Pat. No. 4,951,803.

BACKGROUND OF THE INVENTION

Automatic conveyor systems are used to convey small parts or articles to working equipment where working operations are performed on the parts. In certain types of conveyor systems, the articles are stacked in side-by-side relation and the articles are individually separated from the stack and fed in uniform spaced relation to downstream working equipment.

If the system is not fully coordinated, due to upstream equipment operating at a faster rate than the downstream working equipment, or if a stoppage occurs in the downstream working equipment, it is desirable to store the articles. Subsequently, the articles can be discharged from the storage unit and fed to the downstream working equipment at a uniform rate.

SUMMARY OF THE INVENTION

The invention is directed to a method and apparatus for stacking and storing stacks of articles and subsequently separating the individual articles from the stack and feeding the articles to working equipment. The apparatus includes a main conveyor to convey a plurality of small parts or articles, such as video cassette containers, jewelry boxes, or the like. Under normal operating conditions, individual parts or stacks of parts are conveyed on the main conveyor to downstream working equipment. However, in the event of a stoppage in the downstream working equipment, or if the production rate of upstream equipment exceeds that of downstream equipment, the partsd or stacks are routed via a by-pass conveyor to a storage unit.

The storage unit includes a plurality of secondary conveyors that are disposed normal to a side edge of the by-pass conveyor. As each part stack is conveyed along the by-pass conveyor, it is stopped at a position aligned with a secondary conveyor and the part or stack is then pushed laterally by a pushing mechanism onto the secondary conveyor and into bearing engagement with a movable stop member. Succeeding parts or stacks are pushed from the by-pass conveyor onto the secondary conveyor and into engagement with the preceding part or stack to form a composite stack.

When a composite stack of predetermined size has been formed, the composite stack is lifted upwardly from the secondary conveyor by a lift mechanism to a storage site. Subsequently, when the downstream stoppage has been corrected and it is desired to feed the articles to downstream working equipment, the composite stack is lowered back onto the moving secondary conveyor and the stop member is lowered to a nonobstructing position. As the composite stack approaches the downstream end of the secondary conveyor, each article is separated from the composite stack and fed to the main conveyor, located on the opposite side of the storage unit from the by-pass conveyor, where the articles are individually conveyed to downstream working equipment.

In a preferred form of the invention, the storage unit includes a pair of individually movable storage sections or magazines, each having a plurality of side-by-side storage compartments and a secondary conveyor is associated with each compartment. The parts or stacks are sequentially fed from the by-pass conveyor onto the secondary conveyors of the compartments of one of the magazines, and then fed onto the secondary conveyors of the compartments of the second of the magazines. While the parts are being fed to the second magazine, the first magazine is elevated to lift the tier of composite stacks from the secondary conveyors and index the first magazine to receive a second tier of additional stacks from the main conveyor.

When unloading the composite stacks from the storage unit, the procedure is reversed with the second magazine being lowered to sequentially deposit the stacks from each compartment onto the respective secondary conveyors, followed by lowering of the first magazine to release the stacks onto the respective secondary conveyors. While the stacks are being released from the compartments of the first magazine, the second magazine is indexed downwardly to a position to release a second tier of stacks from the compartments of the second magazine.

With the invention, if the rate of delivery of individual parts or stacks is greater than the rate at which the parts can be accepted by downstream working equipment, the parts can be stored in the storage unit and subsequently released to the working equipment to provide a uniform rate of flow of parts to the working equipment at all times.

Other objects and advantages will appear in the course of the following description.

DESCRIPTION OF THE DRAWINGS

The drawings illustrate the best mode presently contemplated of carrying out the invention.

In the drawings:

FIG. 5 is a fragmentary horizontal section showing the discharge end of one of the secondary conveyors in the storage unit;

FIG. 6 is an enlarged section showing the separation of the articles from a stack and the feeding of the separated articles to the discharge conveyor.

DESCRIPTION OF THE ILLUSTRATED EMBODIMENT

Figure 1:
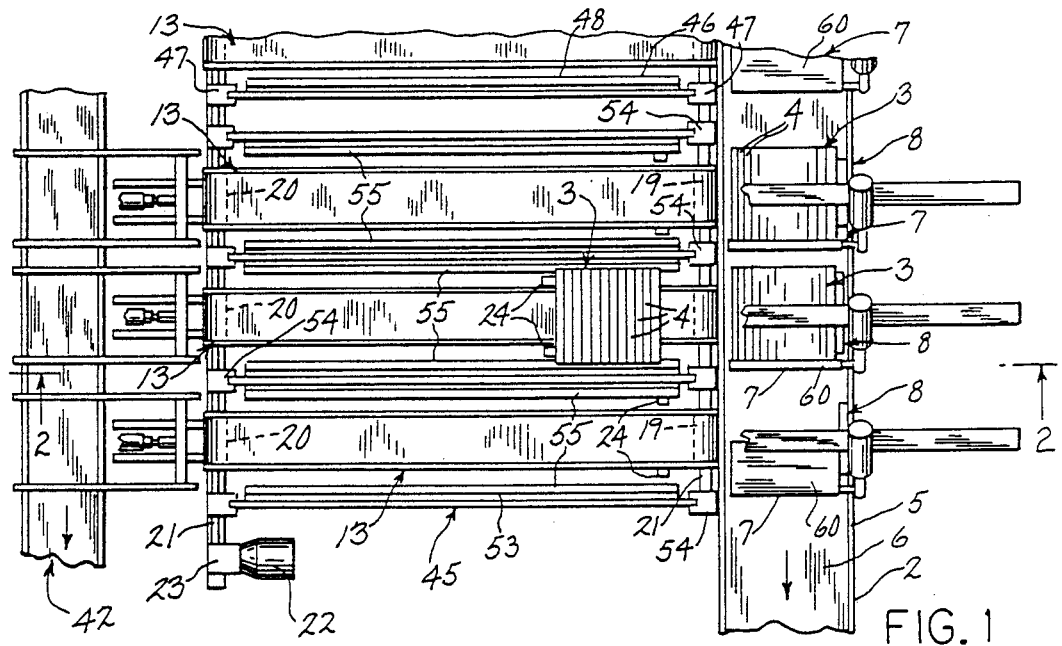
FIG. 1 is a top plan view of the apparatus of the invention with parts broken away.
Figure 2:
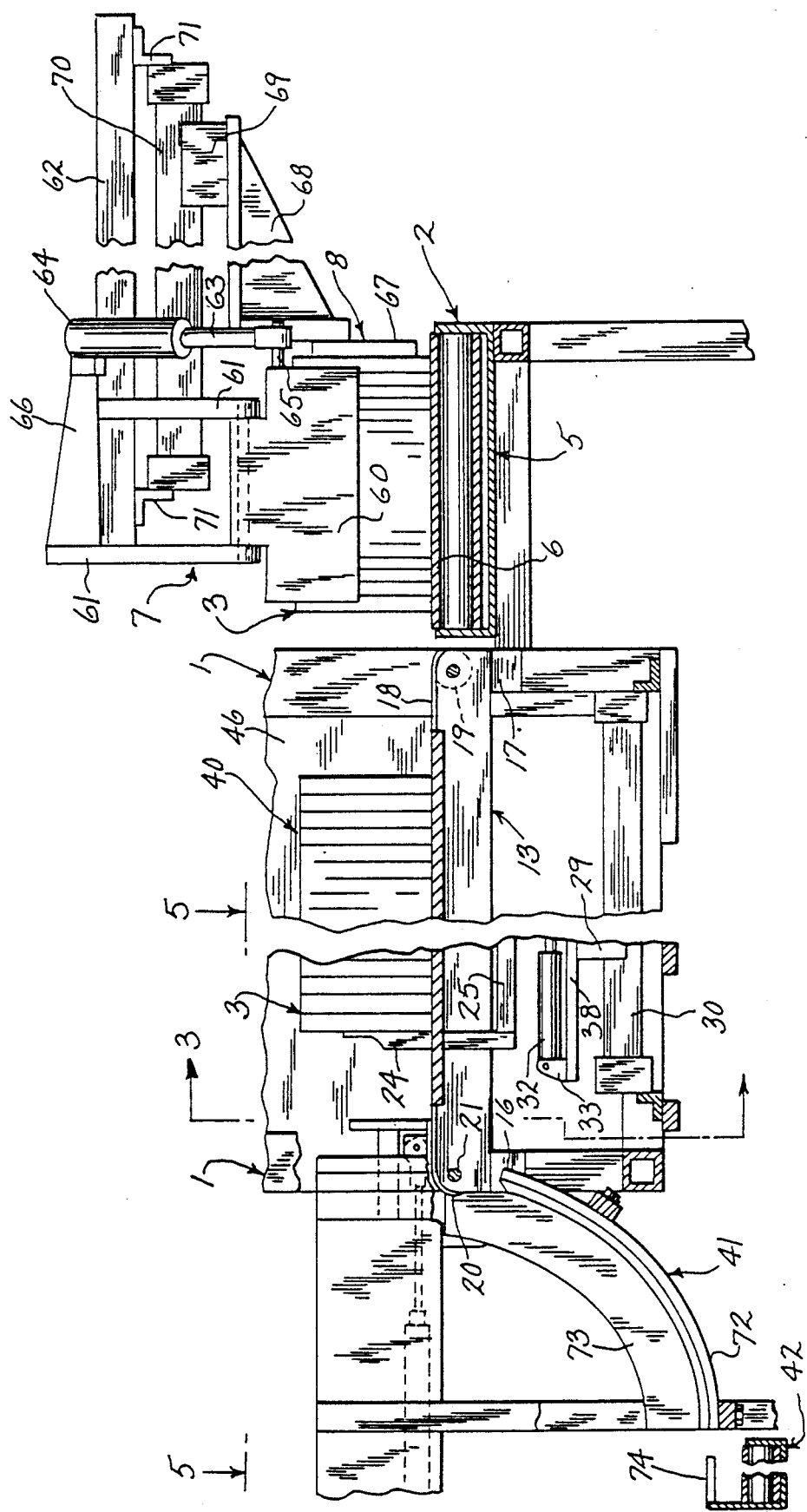
FIG. 2 is a view taken along line 2—2 of FIG. 1.

As shown in FIG. 1 and 2, the apparatus includes a main frame or supporting structure 1, that supports a main or conveyor 42. In normal operation of the conveyor system, the individual parts or articles 3 are conveyed directly on conveyor 42 to downstream working equipment. In the event the downstream working equipment cannot handle the parts at the rate they are being delivered on conveyor 42, the parts are routed to a by-pass conveyor 2 and then stored or accumulated in a storage unit, and subsequently released at a uniform rate to conveyor 42 and delivered to working equipment. To accelerate the storage operation, the parts or articles 4 can be initially stacked in side-by-side stacks 3 by stacking equipment, not shown, and the stacks 3 are delivered in spaced relation on conveyor 2 to the storage unit. Stacking is not essential, and if the production rate is slow, the individual parts 4 can be fed on conveyor 2 directly to the storage unit.

Conveyor 2 is of conventional construction and includes a generally U-shaped frame 5 which supports a belt 6 for endless travel. Belt 6 is supported on a drive pulley or spindle and an idler pulley, not shown, and the drive pulley is driven in a conventional manner to move the belt 6 in its endless path.

To effect storage of the stacks 3, a plurality of pairs of stop assemblies 7 are located in spaced relation along coneyor 2 and each stop assembly, as will be hereinafter described. includes a gate which is movable between an obstructing position where it is located above belt 6 in the path of travel of stack 3, to stop the stack, to a retracted or non-obstructing position, where it will not interfere with movement of the stacks on conveyor 2.

A pusher unit 8 is associated with each stop assembly 7. With a stack 3 stopped on conveyor 2 by stop assembly 7, pusher unit 8 is actuated to push the stack laterally from conveyor 2 onto one of a plurality of parallel secondary conveyors 13, which extend laterally from a side edge of conveyor 2.

Each secondary conveyor unit 13 is composed of a generally U-shaped frame 15 which is supported at its respective ends on horizontal beams 16 and 17 which are connected to main frame 1. Each conveyor 13 includes a belt 18 which is trained about a drive pulley 20 and an idler pulley 19. As shown in FIG. 1, common shaft 21 is connected to the drive pulleys 20 of all of the conveyors 13 and shaft 21 is driven by a motor 22 operating through a gear box 23. The manner of driving the parallel conveyors 13 is similar to that described in U.S. Pat. No. 3,923,148.

Associated with each conveyor 13 is a pair of movable stop members 24 which straddle the conveyor.

Figure 4:
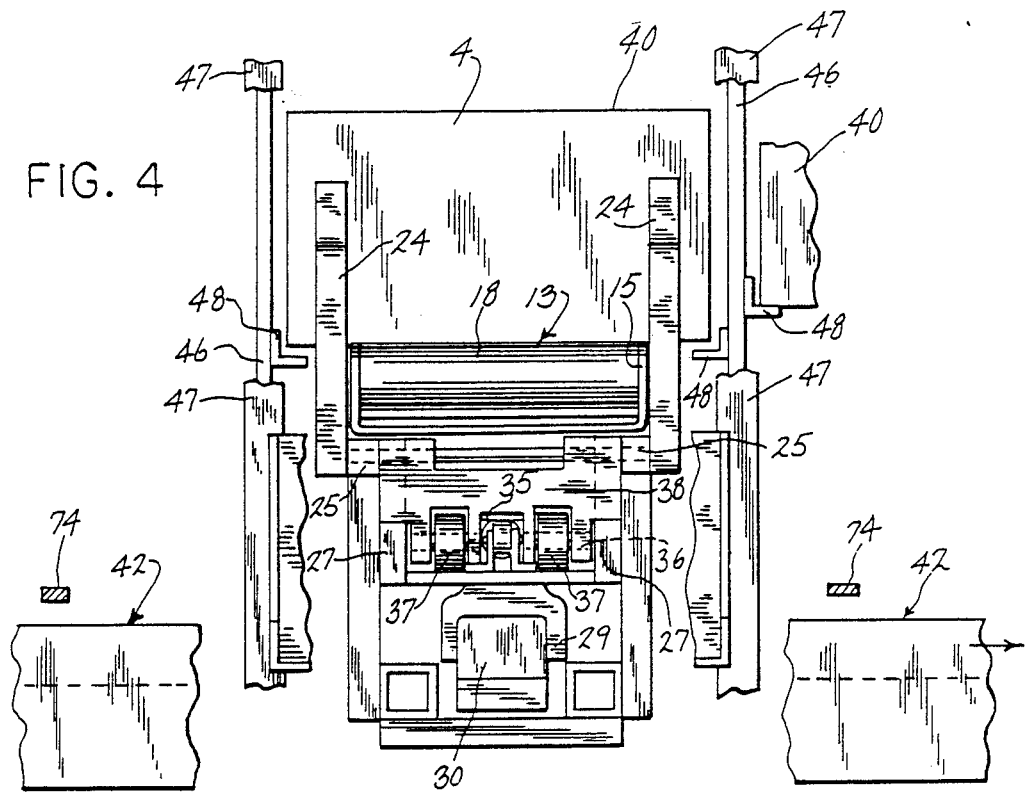
FIG. 4 is an enlarged fragmentary front elevation showing the pivoting stop member and the discharge chutes.

As best illustrated in FIG. 4, the length of the articles 4 in stack 3 is greater than the distance between the side edges of conveyor 13, so that the ends of the stack project outwardly beyond the respective conveyors 13.

As best shown in FIGS. 5 and 6, the lower ends of stop members 24 are each connected to an arm 25 that extends along the respective side edges of conveyor 13 and the upstream ends of arms 25 are pivotally connected to a shaft 26 that extends transversely beneath the conveyor. The ends of shaft 26 are supported by upstanding posts 27 that extend upwardly from plate 28. As shown in FIG. 6, plate 28 is mounted on the carrier 29 of a rodless cylinder 30 and the cylinder is supported on the fixed horizontal frame member 31.

Stops 24 are adapted to be moved between an upper obstructing position, as shown in FIG. 2, where they will be engaged by the side portions of the forward end of the stack 3 to stop movement of the stack on the moving conveyor 13, to a lower non-obstructing position, as illustrated in FIG. 6. To move the stops 24 between the positions, one end of a pneumatic cylinder 32 is pivotably mounted through lugs 33 to plate 28 and a piston rod 34 extends outwardly from the opposite end of cylinder 32 and is connected to a block 35 that is mounted on transverse shaft 36. Rollers 37, which are journalled on the shaft 36 and straddle block 35, ride on plate 28 as the piston rod 34 is extended and retracted.

As shown in FIG. 4, a plate 38 is also mounted for pivotal movement on shaft 36 and the lower edge of plate 38 is provided with suitable cut-outs to receive block 35 and rollers 37. The upper end of plate 38 is pivotally connected by shaft 39 to arms 25 of stops 24.

With this arrangement, extension of piston rod 34 will move shaft 36 in an upstream direction, thereby pivoting plate 38 downwardly and correspondingly pivoting stops 24 to the lower non-obstructing position, as shown in FIG. 6, where they will not interfere with movement of stack 3 on conveyor 13.

The rodless cylinder 30 is of conventional construction and includes a piston which is connected to carrier 29. Introducing fluid into the outer end of cylinder 30 will move the piston and carrier 29 and stop members 24 toward the main conveyor 2. As the stacks 3 are pushed onto the conveyors 13, the leading end of the stack will engage stops 24 to move the stops and carrier 29 relative to cylinder 30. In this condition, the pressure in the cylinder 30 is released so that only the friction of the piston operating within the cylinder will resist the movement of the stack 3 as it is pushed onto the secondary conveyors.

As each succeeding stack is pushed onto the secondary conveyor, it will engage the trailing edge cf the preceding stack and again push stops 24 in a direction away from conveyor 2. This operation of feeding stacks from conveyor 2 to each secondary conveyor 13 is continued until carrier 29 reaches the end of its stroke and a composite stack 40 of desired length has been formed on the secondary conveyor. When stops 24 are in the upright obstructing position, the links 25 and 38 act as a toggle mechanism in which the pivot axis 39 is positioned upstream or overcenter of a vertical plane passing through the pivot axis 36. In an overcenter or on-center condition, the toggle linkage is in a locked condition and the pressure of stack 3 against stops 24 will not pivot the stops downwardly. Thus, the stops 24 are locked in the upright position and extension of piston rod 34 will release the toggle linkage and lower the stops.

If it is desired to feed the articles 4 from the composite stack 40 to working equipment, the stops 24 are moved to the lower release position, as shown in FIG. 6, and the composite stack will then move toward the downstream end of the secondary conveyor on the moving conveyor belt 18. As the composite stack 40 reaches the downstream end of the secondary conveyor, each article 4 will be separated from the composite stack, as shown in FIG. 6, and will be discharged down a curved chute 41 to a discharge conveyor 42. Conveyor 42 can have a construction similar to that of conveyor 2 and acts to convey each individual article in substantially uniformly spaced relation to working equipment.

In the event there is a stoppage downstream, or in the event the downstream working equipment cannot operate at a speed sufficient to handle the rate of feed of articles 4 on in-feed conveyor 2 from the secondary conveyors 13, a storage system is incorporated with the secondary conveyors.

Figure 3:
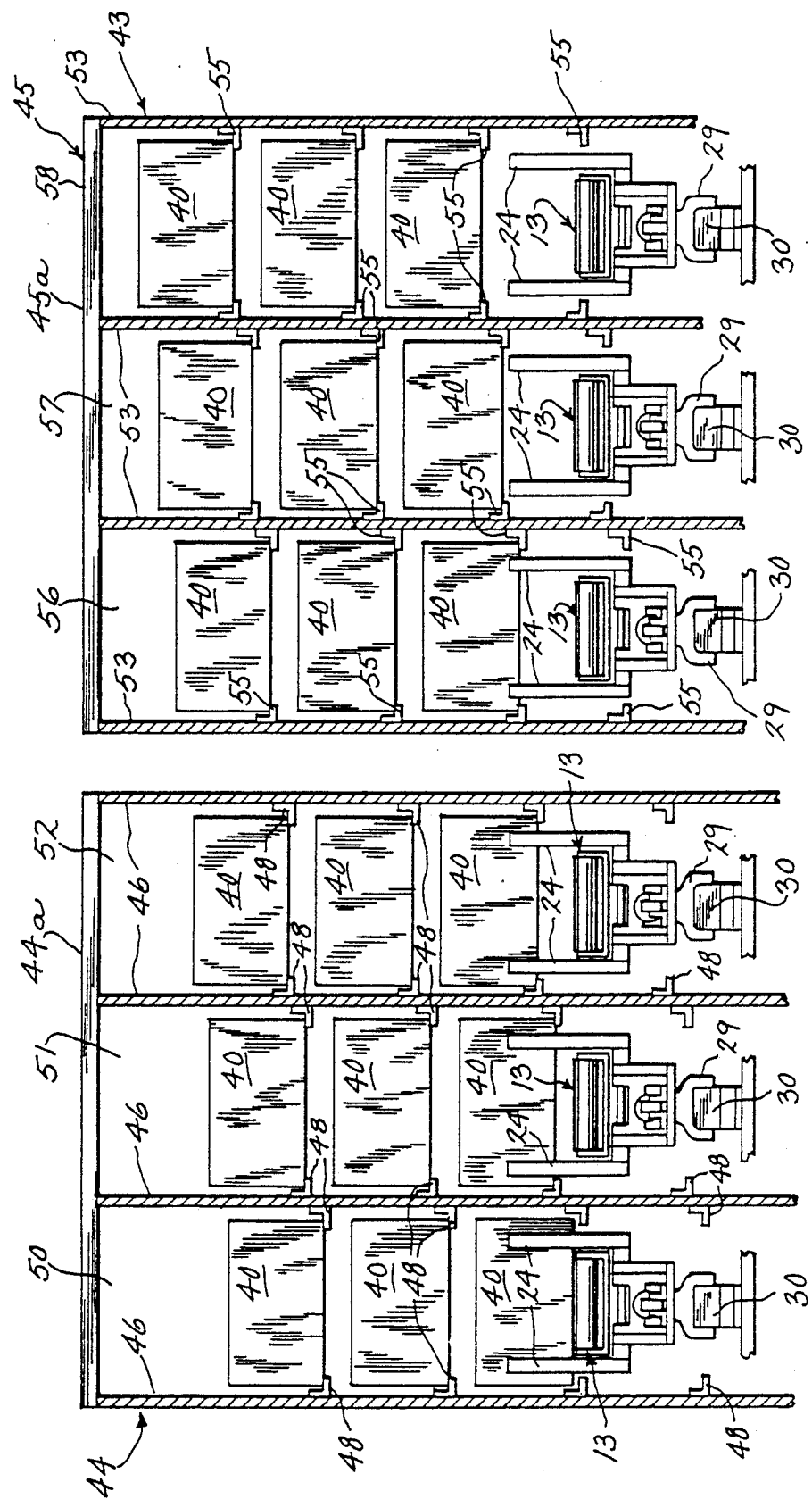
FIG. 3 is a section taken along line 3—3 of FIG. 2.
Figure 7:
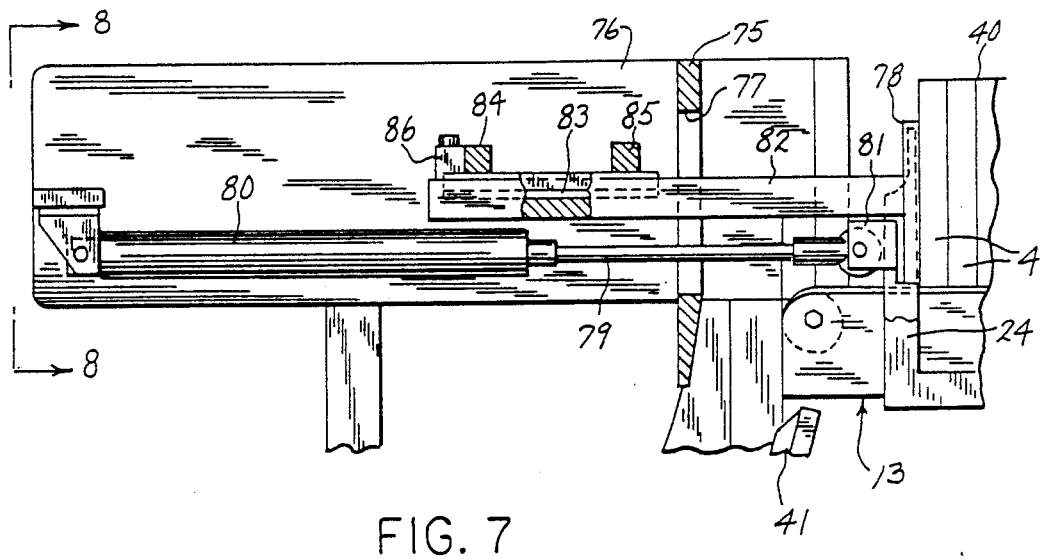
FIG. 7 is a view similar to FIG. 6 and showing the pusher in an extended position over the secondary conveyor.
Figure 8:
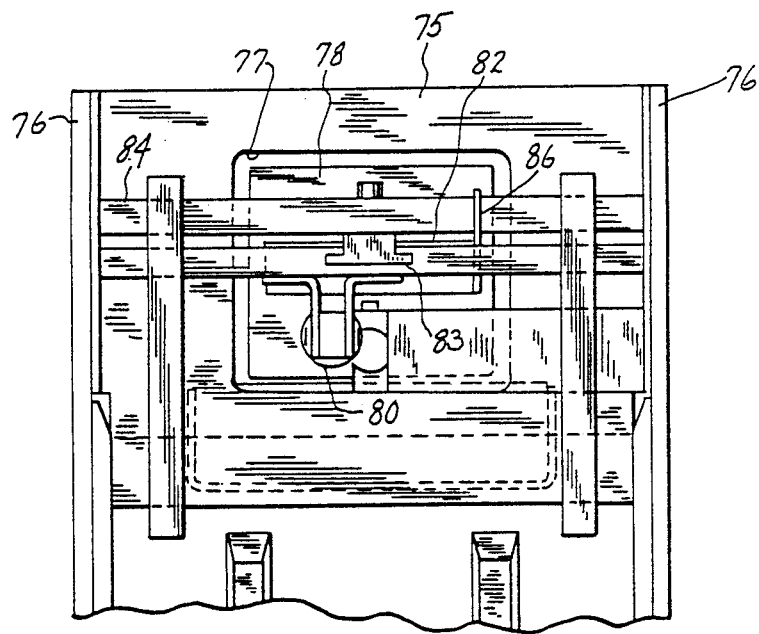
FIG. 8 is a view taken along line 8—8 of FIG. 7.

Storage unit 43, as best shown in FIG. 3, is composed of pair of sections 44 and 45 and, as illustrated, three secondary conveyor units 13 are associated with each section 44, 45. However, the storage unit can have any number of storage sections with one or more secondary conveyors associated with each section.

Each storage section 44, 45 can be similar in construction to that disclosed in U.S. Pat. No. 4,609,091 and includes a carriage or magazine 44a, 45a which is adapted to be moved vertically on frame 1, by a drive mechanism that can be of the type shown in U.S. Pat. No. 4,609,091. The construction of that patent is incorporated herein by reference.

The movable magazine 44a of storage section 44 includes of a plurality of spaced vertical plates 46 and the respective ends of plates 46 are guided in vertical movement in guides 47 which are mounted on beams 16 and 17 respectively. The sides of each plate 46 are provided with a plurality of vertically spaced angle-shaped rails or supports 48, which define shelves to support the side edges of the respective composite stacks 40 as will hereinafter be described.

As illustrated in FIG. 3, magazine 44a defines three side-by-side storage compartments, 50, 51 and 52 and the shelves 48 in the storage compartment 51 are at a slightly higher level than the shelves of storage compartment 50, in the range of about ½ inch. Similarly, the shelves 48 of storage compartment 52 are at a slightly higher elevation than the corresponding shelves of compartment 51.

The magazine 45a is similar in structure to magazine 44a and includes a plurality of spaced vertical plates 53, the ends of which are guided for vertical movement in end guides 54, which are mounted on the beams 16 and 17, respectively. A series of vertically spaced angle-shaped rails 55 are mounted on each of the plates 53 and serve to support the opposite sides of the composite stack 40, as it is raised above the secondary conveyor 13, as will be hereinafter described.

As shown in FIG. 3, magazine 45a defines three storage compartments 56, 57 and 58, and the rails 55 of storage compartment 57 are located slightly above the corresponding rails of storage compartment 56. Similarly, the shelves or rails 55 of storage compartment 58 are located slightly above the corresponding rails of storage compartment 57.

While the drawings show plates 46 and 53 extending continuously along the length of conveyors 13, in some installations where greater access is desired, the rails 48 and 55 can be supported by spaced vertical strips instead of plates 46 and 53.

Each stop assembly 7, as best illustrated in FIG. 2, includes a pivotable gate 60 that extends transversely across conveyor 2 and the upper edge of gate 60 is pivoted to the lower ends of arms 61 that extend downwardly from beam 62. Each gate 60 can be pivoted from a generally vertical position where it will obstruct flow of stacks 3 on conveyor 2 to an upper inclined position where it will not interfere with flow of the stacks 3 on conveyor 2. To individually pivot the gates 60, the piston rod 63 of a pneumatic cylinder 64 is pivotally connected to an ear 65 that extends outwardly from gate 60, while the cylinder 64 is pivoted to web 66 that extends upwardly from beam 62. By retracting piston rod 63, gate 60 will be moved from the vertical obstructing position to the upper non-obstructing position.

The pusher unit 8 that acts to push a stack 3 stopped by gate 60 on conveyor 2 onto the corresponding conveyor 13, includes a pusher plate 67 that is positioned alongside a side edge of conveyor 2. Plate 67 is connected through bracket 68 to the carrier 69 of a rodless cylinder 70 that is mounted by brackets 71 from beam 62. Operation of cylinder 70 will move pusher plate 67 across conveyor 2 to push a stack 3 onto the corresponding conveyor 13.

Each chute 41 includes a pair of spaced curved guides 72 and a pair of side plates 73. The lower end of the chute is spaced above the belt of main conveyor 42, a distance slightly greater than the thickness of article 4, so that an article 4 moving down chute 41 will not engage the side of a previously discharged article on conveyor 42 if that article has not been fully conveyed away on conveyor 42 by the time the succeeding article approaches the conveyor.

Under high speed operating conditions articles 4 being fed down chute 41 may slightly overlap each other to provide a shingled effect. To eliminate the shingled condition, a bar 74 can be mounted slightly above conveyor 42 at a location slightly downstream of each conveyor 13 in position to be engaged by the upper or shingled article. The leading end of the shingled article will engage bar 74 to hold back its movement until it can fall onto the conveyor 42 behind the lower of the shingled articles.

To aid in transferring articles 4 from each secondary conveyor 13 to the main conveyor 42, a vertical plate 75 is mounted in a location spaced from the end of each conveyor 13 and the ends of the plate 75 are attached between parallel plates 76. As the article 4 tilts as it falls from the downstream end of conveyor 13, the upper edge of the article will engage plate 75, as shown in FIG. 6, to guide the article to chute 41.

In certain instances, depending on the programming of the conveyor system, the operation of a conveyor 13 may be terminated before all of the articles have been transferred to the chute 41 and conveyor 42. In this case it is desirable that the remaining articles on conveyor 13 be moved upstream to a location adjacent the in-feed conveyor 2 in position for a subsequent storing operation. In this connection, each plate 75 is formed with a central opening 77 and a pusher 78 is mounted within the opening 77. During normal operation, pusher 78 is flush with the face of plate 75 that faces conveyor 13, as shown in FIG. 6. However, if the transfer of articles 4 is stopped before all the articles have been transferred to the chute 41, the remaining articles are pushed upstream to a location within the stroke of stop members 24 so that the stop members can then return the remaining articles to the upstream end of conveyor 13.

To actuate pusher 78, the piston rod 79 of a fluid cylinder 80 is attached to a bracket 81 mounted on the rear face of pusher 78. By extending piston rod 79, pusher 78 will be moved upstream with respect to conveyor 13 to push the group of remaining articles to a location where they can be engaged by the stop members 24 when the stop members are pivoted to their upper operative position.

Pusher 78 is guided in movement by a guideway 82 that extends rearwardly from the pusher and is slidable on a T-shaped guide bar 83. Guide bar 83 is supported by spacer bars 84, 85 from plates 76. The forward stroke of pusher 78 is limited by engagement of stop 86 on guideway 82 with bar 84.

In operation, stacks 3 are conveyed on conveyor 2 in spaced relation. To store the stacks 3, the gate 60 of stop assembly 7 located immediately downstream of the conveyor 13 associated with compartment 58 of carring 45a, is lowered to stop the stack on the moving conveyor 2.

Pusher plate 67 is then actuated to push the stack 3 from conveyor 2 onto the conveyor 13 and into engagement with the movable stops 24. Stops 24 will move away from conveyor 2 as the stack is moved onto the conveyor 13. As previously described, the toggle linkage will prevent the stops 24 from pivoting downwardly as the stack 3 engages the stops.

A second stack is then stopped by the lowered gate 60 and the second stack is then pushed onto the conveyor 13 associated with compartment 58 and into engagement with the trailing end of the first stack to form a composite stack 40. Again, stops 24 are pushed downstream as the second stack is pushed onto the secondary conveyor 13. This operation is repeated to form a composite stack 40 of desired length.

If at this stage, the blockage downstream has been corrected, the composite stack 40 can be released from the conveyor 13 by pivoting the stops 24 downwardly to the release position through operation of cylinder 32, in which case each article 4 will be separated from the composite stack and fed through chute 41 to the main conveyor 42, as shown in FIG. 6.

On the other hand, if it is desired to store the composite stack 40, the magazine 45a is indexed upwardly, bringing the shelves 55 of compartment 58 into engagement with the overhanging ends of the composite stack to lift the composite stack upwardly from the conveyor 13. The upward movement is only sufficient to raise the stack in compartment 58 above the conveyor 13, but the shelves 55 of the adjacent compartment 57 will still be beneath the level of the associated conveyor 13. This action is repeated with a second composite stack 40 being similarly formed in compartments 57 and 56 and lifted from the respective secondary conveyors 13 by elevation of the magazine 45a. When compartment 58, 57 and 56 have been loaded with a first tier of composite stacks, the loading is shifted to compartments 52, 51 and 50 of magazine 44a. As composite stacks are formed in sequence i compartments 52, 51 and 50, magazine 45a is elevated a distance approximately the height of a stack to position the shelves 55 of compartment 58 in a ready position so that the compartment 58 can be loaded with a second tier stack when the loading of compartment 50 is completed. In this manner, the storage compartments 58–56 of magazine 45a, as well as storage compartments 52–50 of magazine 44a can be filled with the stacked articles.

When it is desired to feed the stored stacks 40 to working equipment, magazine 44a is lowered to return the lowermost stack 40 of compartment 50 onto the respective conveyor 13. At this time, the lowermost stacks in the storage compartments 51 and 52 will be above the level of the conveyor belts 18 of the respective conveyors 13, so they will not contact the moving conveyor belts. The stop members 24 associated with the conveyor 13 of storage compartment 50 is then moved to the lowered or released position, enabling the composite stack 40 from compartment 50 to move to the downstream end of the secondary conveyor 13, where the articles 4 are individually separated from the stack and fed through the chute 41 to the conveyor 42.

After the lowermost stack 40 from storage compartment 50 has been discharged from the conveyor 13, magazine 44a is again lowered in an increment sufficient to position the lowermost stack in compartment 51 on the moving belt 18 of the respective secondary conveyor 13. At this time, the lowermost stack 40 in storage compartment 52, is located at a level above the belts 18, so it will not ride against the moving belt as the stack in compartment 51 is discharged by release of stop members 24.

In the same manner, the lowermost stack 40 is discharged from the compartment 52 and subsequently the lowermost stacks are discharged from storage compartments 56–58 by incremental lowering of magazine 45a. This procedure is repeated to release all of the stacks 40 in compartments 50–52 and 56–58 onto the secondary conveyors 13.

As the shelves 48 and 55 are all at different levels, only the stack 40 of a single storage compartment will ride on its associated conveyor belt 18 and the stacks in the remaining storage compartments will be spaced above the moving belts to prevent wear or abrasion on the articles in the stack.

The independent operation of magazines 44a and 45a is important in high speed applications for each magazine is only required to move a short vertical distance during loading of the compartments of that magazine, and the greater increment of vertical movement is carried out during the period when the other magazine is being loaded. This substantially increases the overall speed of operation and enables the stacks to be loaded without interruption. At low speed operation, the magazines could store different articles or parts.

By virtue of the invention, stacks of side-by-side stacked articles can be unstacked and fed at a uniform rate to working equipment. In the event the working or downstream equipment cannot keep up with the rate of unstacking, the stacks can be stored and subsequently released at the desired time to provide the uniform feed rate to the working equipment.

While the above description has shown the invention used to store stacks of articles, it is contemplated that the invention can also be employed to store individual objects or articles of various configurations.

Various modes of carrying out the invention are contemplated as being within the scope of the following claims particularly pointing out and distinctly claiming the subject matter which is regarded as the invention.

I claim:

1. In combination, conveyor means to convey a plurality of articles in a downstream direction, stop means mounted for movement with respect to said conveyor means from a non-obstructing position where said stop means will not interfere with movement of said articles on said conveyor means to an obstructing position where said stop means is disposed in the path of movement of said articles on said conveyor means, said stop means also being mounted for movement longitudinally of said conveyor means from a downstream position to an upstream position, said stop means being freely movable in a downstream direction, first operating means for moving said stop means between the obstructing and non-obstructing positions, second operating means for moving said stop means from the downstream to the upstream position, a first of said articles on said conveyor engaging said stop means when in said obstructing and upstream position, and each subsequent article engaging the preceding article to form a train of articles on said conveyor means, pusher means disposed at the downstream end of said conveyor means and mounted for movement between a storage position where said pusher means will not interfere with discharge of said articles from said conveyor means and an extended position where said pusher means is located above said conveyor means and upstream of the downstream position of said stop means, and third operating means for moving said pusher means from the storage position to the extended position to push any articles remaining on said conveyor means to a location upstream of the downstream position of said stop means, whereby said stop means can then move said remaining articles to the upstream end of said conveyor means.

2. The apparatus of claim 1, wherein said stop means is mounted for pivotal movement between said obstructing and non-obstructing positions, said non-obstructing position being at a level beneath said conveyor means.

3. In an apparatus for unstacking articles, conveyor means to convey a group of articles in a downstream direction, separating means disposed at the downstream end of said conveyor means for separating each article from said group, stop means mounted for movement with respect to said conveyor means from a non-obstructing position where said stop means will not interfere with movement of said articles on said conveyor means to an obstructing position where stop means is disposed in the path of movement of said articles on said conveyor means, said stop means also being mounted for movement longitudinally of said conveyor means from a downstream position to an upstream position, first operating means for moving said stop means between the obstructing and non-obstructing positions, second operating means for moving said stop means between the downstream and upstream positions, pusher means disposed at the downstream end of said conveyor means and mounted for movement between a storage position where said pusher means will not interfere with separation of said articles from said group and an extended position where said pusher means is located above said conveyor means and upstream of the downstream position of said stop means, and third operating means for moving said pusher means from the storage position to the extended position to push said group of articles to a location upstream of the downstream position of said stop means, subsequent operation of said first and second operating means acting to move said group to the upstream end of said conveyor means.

4. The apparatus of claim 3, wherein said stop means is freely movable in a downstream direction with respect to the conveyor means.

5. The apparatus of claim 4, wherein said stop means is mounted for pivotal movement between said non-obstructing and obstructing positions about an axis tranverse to the direction of movement of said conveyor means, and said apparatus includes means to prevent pivotal movement of said stop means from the obstructing position to the nonobstructing position by pressure of said objects against said stop means.

6. The apparatus of claim 5, wherein said means to prevent pivotal movement comprises a toggle linkage having a locked position when said stop means is in the obstructing position and having an unlocked position when said stop means is in the unobstructing position, first operating means having means being operably connected to said toggle linkage to move said linkage from said locked to the unlocked position.

7. The apparatus of claim 3, wherein said separating means includes an end member spaced from the downstream end of said conveyor means to provide a gap, said articles individually being discharged through said gap.

8. The apparatus of claim 7, wherein said end member is provided with an opening and said pusher means comprises a plate disposed within the opening when said pusher means is in the storage position.

* * * * *

UNITED STATES PATENT AND TRADEMARK OFFICE
CERTIFICATE OF CORRECTION

PATENT NO. : 5,002,457

DATED : March 26, 1991

INVENTOR(S) : WOLFGANG C. DORNER ET AL

It is certified that error appears in the above-identified patent and that said Letters Patent is hereby corrected as shown below:

Claim 6, column 10, line 23, before "first" insert -- said --.

Signed and Sealed this

First Day of September, 1992

Attest:

DOUGLAS B. COMER

*Attesting Officer*  *Acting Commissioner of Patents and Trademarks*